United States Patent
Kokku et al.

(10) Patent No.: US 10,506,303 B1
(45) Date of Patent: Dec. 10, 2019

(54) PERSONALIZED VIDEO INTERJECTIONS BASED ON LEARNER MODEL AND LEARNING OBJECTIVE

(71) Applicants: International Business Machines Corporation, Armonk, NY (US); Sesame Workshop, New York, NY (US)

(72) Inventors: Ravindranath Kokku, Yorktown Heights, NY (US); Tamer E. Abuelsaad, Armonk, NY (US); Prasenjit Dey, Bangalore (IN); Jodi M. Cutler, Austin, TX (US); Allison C. Allain, Brooklyn, NY (US); Aditya Sinha, Bangalore (IN); Satyanarayana V. Nitta, Cross River, NY (US); Miles Ludwig, New York, NY (US); Emily Reardon, Brooklyn, NY (US); Nick Bartzokas, Brooklyn, NY (US); James Gray, Cambridge, MA (US); Michelle Newman-Kaplan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/040,200

(22) Filed: Jul. 19, 2018

(51) Int. Cl.
*H04N 9/80* (2006.01)
*H04N 21/845* (2011.01)
(Continued)

(52) U.S. Cl.
CPC ......... *H04N 21/845* (2013.01); *G06F 16/447* (2019.01); *G06F 16/78* (2019.01); *G06K 9/00744* (2013.01); *G09B 5/00* (2013.01)

(58) Field of Classification Search
CPC ........ G09B 5/00; G09B 7/00; H04N 21/4532; H04N 21/84; H04N 21/2668
(Continued)

(56) References Cited

U.S. PATENT DOCUMENTS

| 7,778,948 B2 | 8/2010 | Johnson et al. |
| 8,784,108 B2 | 7/2014 | Dohring et al. |

(Continued)

OTHER PUBLICATIONS

Kickmeier-Rust, M. D., & Albert, D., "Micro-Adaptivity: Protecting Immersion in Didactically Adaptive Digital Educational Games," Journal of Computer Assisted Learning 26.2, Mar. 9, 2010, 95-105.
(Continued)

*Primary Examiner* — Robert Chevalier
(74) *Attorney, Agent, or Firm* — Scully, Scott, Murphy & Presser, PC; Daniel P. Morris, Esq.

(57) ABSTRACT

Personalized video interjections based on a learner model and a learning objective. A method for adding interjections to a video includes analyzing the content of a plurality of videos based on a set of learning objectives, generating and storing educational content metadata on a timeline for the videos, selecting a video based on a user specific learning objective, determining types of video interjections using an analytics engine that compares a user learner model, the user learning objective and the metadata, determining a location for the video interjections using the analytics engine that compares the user learner model, the learning objective, the metadata and timeline, generating a video interjection for each video interjection type and inserting the video interjections into the video at the determined locations.

20 Claims, 6 Drawing Sheets

(51) Int. Cl.
  *G09B 5/00* (2006.01)
  *G06K 9/00* (2006.01)
  *G06F 16/78* (2019.01)
  *G06F 16/44* (2019.01)
  *H04N 5/93* (2006.01)

(58) Field of Classification Search
  USPC ........ 386/241, 278, 281, 326, 239, 248, 353
  See application file for complete search history.

(56) References Cited

U.S. PATENT DOCUMENTS

| | | |
|---|---|---|
| 8,874,023 B2 | 10/2014 | Elzinga et al. |
| 9,626,875 B2 | 4/2017 | Gal et al. |
| 2005/0175970 A1 | 8/2005 | Dunlap et al. |
| 2009/0187593 A1* | 7/2009 | Chen .................. G06Q 30/0204 |
| 2011/0249867 A1* | 10/2011 | Haas .................. G06K 9/00818 |
| | | 382/103 |
| 2013/0196292 A1 | 8/2013 | Brennen et al. |
| 2017/0178531 A1 | 6/2017 | Swank et al. |
| 2017/0243517 A1 | 8/2017 | Midmore |

OTHER PUBLICATIONS

Khenissi, et al., "Learner Modeling Using Educational Games: A Review of the Literature", Smart Learning Environments, Feb. 27, 2015 2:6, pp. 1-16.

Martinez-Plumed et al., "Making Sense of Item Response Theory in Machine Learning", ECAI, IOS Press, Aug. 29-Sep. 2, 2016, pp. 1140-1148.

EduTech, Wiki, "Open Learner Model", Jul. 9, 2009, pp. 2, http://edutechwiki.unige.ch/en/Open_learner_model.

Peter Reimann, "Open Learner Model (OLM)", Dec. 19, 2014, Next-Tell, pp. 1-4, http://next-tell.eu/portfolios/olm/.

Robert Speer, ConceptNet, "An open, multilingual knowledge graph", Jan. 1, 2018, pp. 3, http://conceptnet.io/.

King et al., "Personalised Education from curriculum to career with cognitive systems", IBM Education, IBM Corporation, Apr. 2016, pp. 1-16.

* cited by examiner

PERSONALIZED VIDEO INTERJECTIONS BASED ON LEARNER MODEL AND LEARNING OBJECTIVE

BACKGROUND OF THE INVENTION

This disclosure is directed to computers and computer applications, and more particularly to computer-implemented methods and systems for generating personalized video interjections based on a learner model and a learning objective and inserting the personalized video interjections into a video at locations in the video to maximize learning.

Computer based adaptive learning solutions have been shown to be effective. However, automated tutoring systems can be much more effective if the learning is interactive and participative. Videos can be quite an engaging medium for knowledge delivery, but effective learning requires the video to have two way interaction. However, interactive engagement does not directly translate to learning, as the learner often can skip over content that they do not understand and still remain engaged since the rest of the content is sufficient for them to understand the overall context.

Current video-based knowledge delivery solutions are one-way, even though they contain significant useful knowledge. The few solutions that include two-way interactions are not personalized to a learner. Instead, typical adaptive learning solutions have specific predetermined interjections that are used equally for all learners without an understanding of the learner's specific learning objective or learning level.

SUMMARY OF THE INVENTION

One embodiment of a computer implemented method for adding interjections to a video includes the steps of storing a plurality of videos having content, analyzing the content of each the plurality of videos based on a set of learning objectives to generate educational content metadata and storing the educational content metadata on a timeline for each of the plurality of videos. The method also includes the steps of receiving a specific learning objective for a user, selecting one of the plurality of videos based on the received user specific learning objective and automatically determining one or more types of video interjections for the selected video using an analytics engine configured to compare a learner model for the user, the user specific learning objective and the educational content metadata of the selected video. The method also includes the step of automatically determining a location for each of the one or more determined types of video interjections using the analytics engine configured to compare the learner model for the user, the user specific learning objective, and the educational content metadata and timeline of the selected video. The method also includes the steps of generating a video interjection for each of the one or more determined video interjection types and inserting the one or more generated video interjections into the selected video at the respective determined location.

A system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

The present disclosure is directed to computer implemented methods and systems for making videos participative, personalized and interactive. In some embodiments, the learning process is personalized to learners based on learner models built over multiple experiences and interactions with a variety of learning solutions. In some embodiments, the methods and systems test the receptive and productive knowledge skills of the learner through interactions and assessments that are appropriate to the specific learner's learner model.

Interjection activities in the videos ensure that the student can participate in the learning more actively. Today, most video activities have a fixed point of interjections based on a concept being tested. The methods and systems of the present disclosure provide technological improvements over the prior solutions by the use of cognitive computing and data analytics to dynamically determine the type of interjections and the point of interjections based on the learner model of the user and the learning objective of the user.

Figure 1:
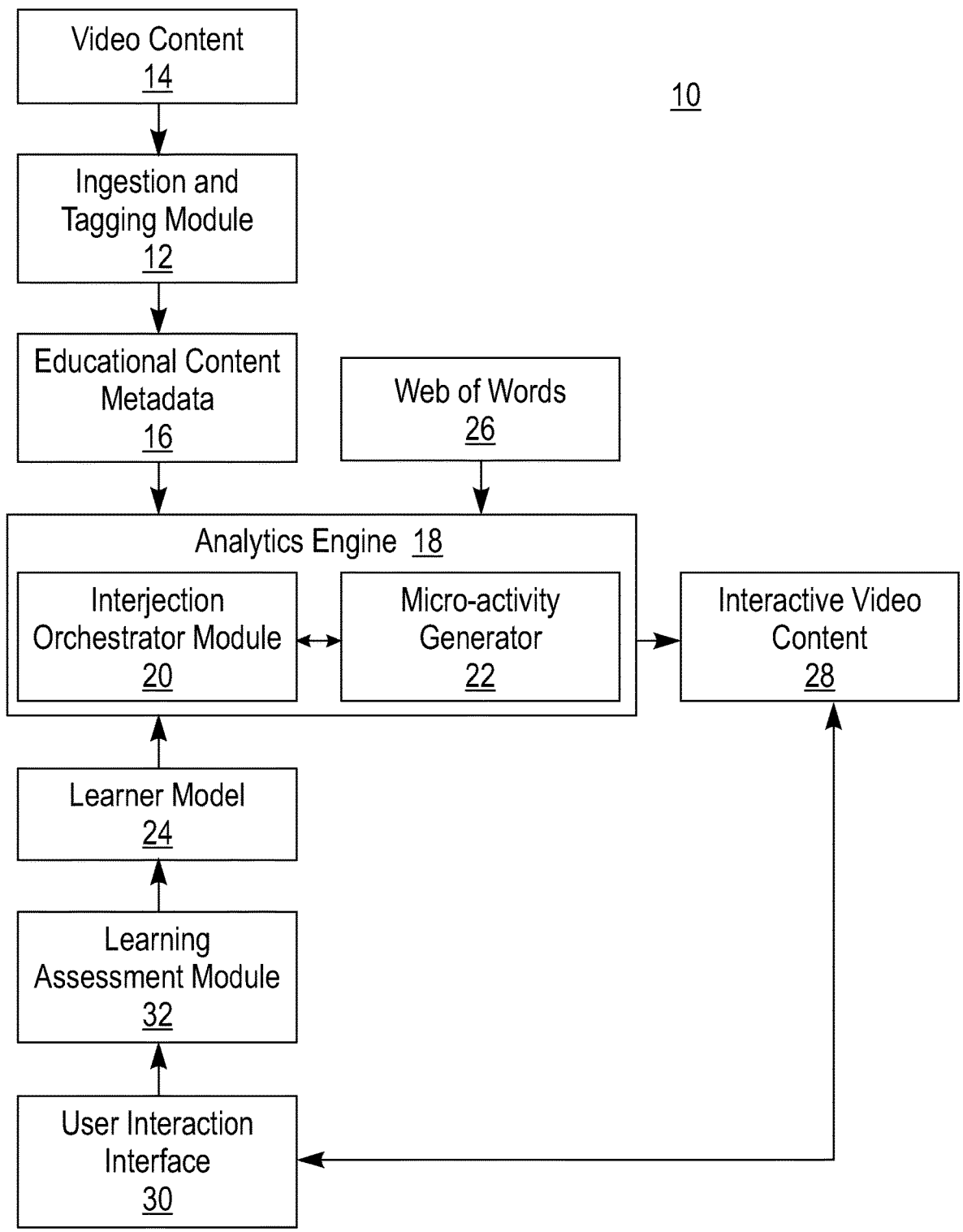
FIG. 1 is a block diagram of one embodiment of the system disclosed in this specification.

FIG. 1 is one embodiment of a system 10 for adding interjections to a video. The system includes an ingestion and tagging module 12 having a storage 14 that stores a plurality of videos having content. The ingestion and tagging module 12 uses video analytics to analyze the content of each of the plurality of videos based on a set of learning objectives and generates educational content metadata for each of the plurality of videos. The educational content metadata is stored in a storage 16 on a timeline for each of the plurality of videos. The system 10 also includes an analytics engine 18 having an interjection orchestrator 20 and a micro-activity generator 22.

The interjection orchestrator 20 receives a specific learning objective for a user and selects one of the plurality of videos based on the received user specific learning objective. The interjection orchestrator 20 automatically determines one or more types of video interjections for the selected video. The interjection orchestrator 20 uses cognitive computing techniques to compare a learner model 24 for the user, the user specific learning objective and the educational content metadata of the selected video. In one embodiment, appropriate interjections are determined based on matching learning words and the metadata. In one embodiment, the matching is based on a web of words 26. The web of word 26 is a data structure that stores the semantic relationships between words. One example of the web of words 26 is the ConceptNet™ knowledge graph. In one embodiment, the learner model 24 is projected on the word web. In one example, for each word in the web of words 26, the learner's mastery of the word is determined from the received learner model and the web of words 26 will indicate different levels of mastery for each word.

Different types of interjections may include, reinforcement, multiple choice questions, a user activity or any other learning types that may be presented on a video. For example, the types of interjections can be coaching instructions (did you see how big that bird was), teaching instructions (a bird is an animal, just like the cat you have at home) or assessment (which of the following are birds).

The interjection orchestrator 20 also automatically determines a location for each of the one or more determined types of video interjections using the cognitive computing techniques to compare the learner model for the user, the user specific learning objective, and the educational content metadata and timeline of the selected video.

The learner model is a computer program that maintains a mastery for each learning objective for the user. In one embodiment, the learner model 24 is a data structure that includes information about the user related to the users learning capabilities and knowledge with respect to a plurality of learning objectives. One example of a learner model 24 is the Open Learner Model (OLM). The OLM is a tool that visualizes an individual's current understanding of a topic, and/or their level of competency. The learner model updates as the student learns, and the data that lies behind the model can come from a variety of sources, such as outcomes of teacher or student self-assessment, or computer-based learning interactions. Learner models are built over time, present the most up to date information about student competency, and allow teachers and students to easily identify strengths and areas of difficulty. The learner model 24 may be generated using Watson Enlight™ or Watson Element™.

The micro-activity generator 22 generates a video interjection for each of the one or more determined video interjection types using the learning objective, the learner model and the education content metadata. In one embodiment, the micro-activity generator 22 matches words of the user specific learning objective with educational content metadata of the selected video based on the web of words 26. In one example, multiple choice questions are generated around facts, relationships and attributes by comparing the learner model and the education content metadata.

The analytics engine 18 then inserts the one or more generated video interjections into the selected video at the respective determined location to create the new interactive video 28 with the interjections.

In one embodiment, the system 10 dynamically adjusts the learner model based on video interactions of the user in response to a video playback of the selected video with the inserted one or more generated video interjections. Use interaction interface records activity of the user in response to the video playback of the selected video with the inserted video interjections. Learning assessment module 32 analyzes the user interactions and inputs the analysis to the learner model 24. The learner model 24 automatically adjusts based on the new inputs from learning and assessment module 32 and the interjection orchestrator 20 dynamically changes the one or more types of video interjections based on the adjusted learner model.

Figure 2:
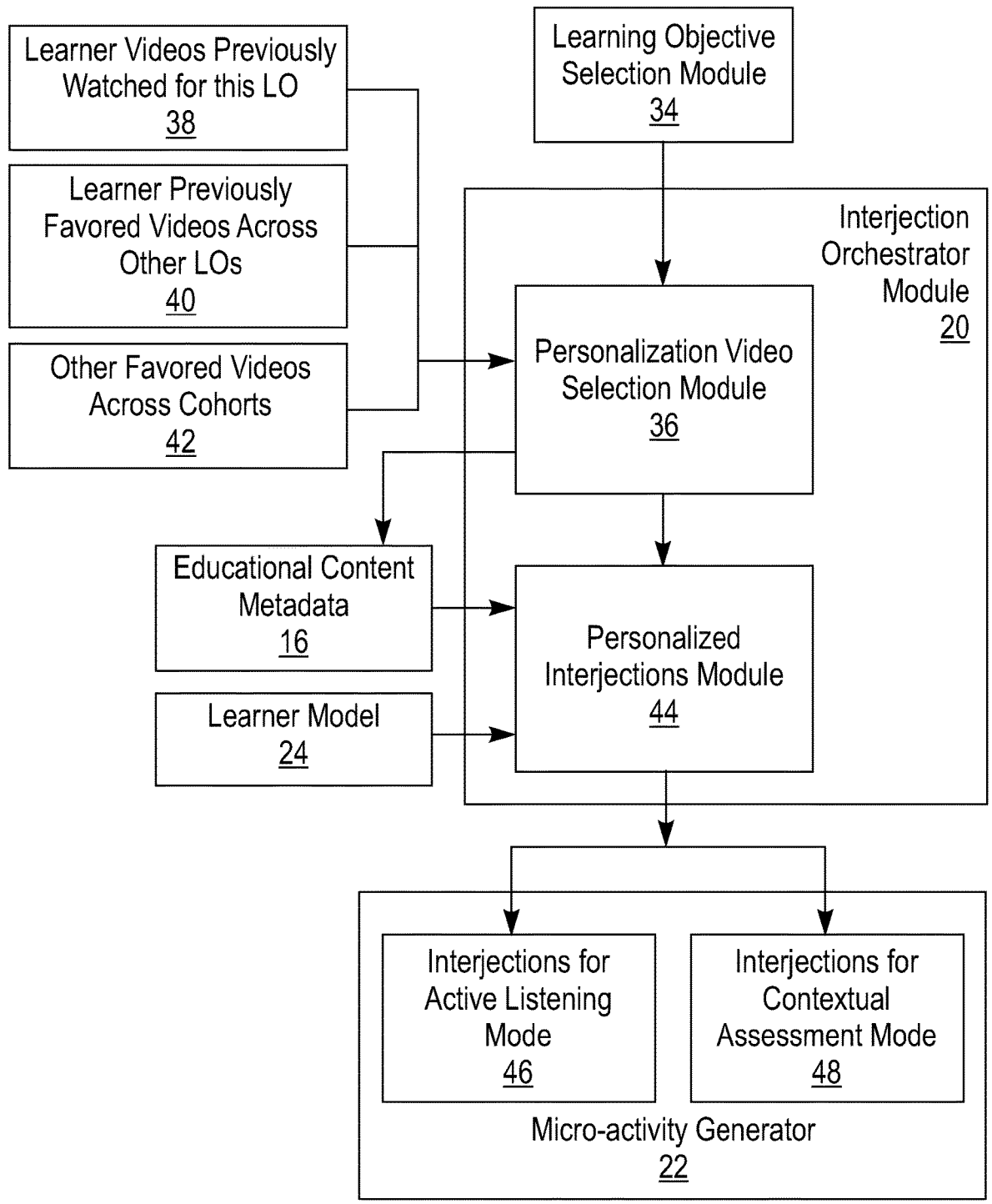
FIG. 2 is a block diagram of one embodiment of the system disclosed in this specification.

As shown in FIG. 2, in one embodiment, the interjection orchestrator 20 receives a specific learning objective for a user from learning objective selection module 34. The selection may be made by the user or an educator via a user interface or other known means from a list a preset objectives. The interjection orchestrator 20 includes a personalization video selection module 36. Based on the received learning objective, the personalization video selection module 36 selects an appropriate video for learner. The personalization video selection module 36 may have as inputs one of more of learner videos 38 previously watched for the received learning objective, learner previously favored videos 40 across other learning objectives and other favored video 42$s$ across cohorts of the learner. A learning objective can have multiple learning videos that may be appropriate. The personalization video selection module 36 performs cognitive computing on the inputs to select the right one for the learner.

The interjection orchestrator 20 also includes personalized interjections module 44. The personalized interjections module 44 has as inputs the educational metadata 16 and the learner model 24. The interjection types and locations can differ from learner to learner. The types and locations can differ based on system knowledge of the learner for same video.

The micro-activity generator 22, in one embodiment, may have an interjections for active listening mode 46. In the active listening mode, active listening interjections are generated that gauge the attention of the learner and try to engage the learner if they are not engaged. The micro-activity generator 22 may also have an interjections for contextual assessment mode 48. In the contextual assessment mode, interjections are generated to assess and reinforce the depth of learner knowledge in the learning objective.

Figure 3:
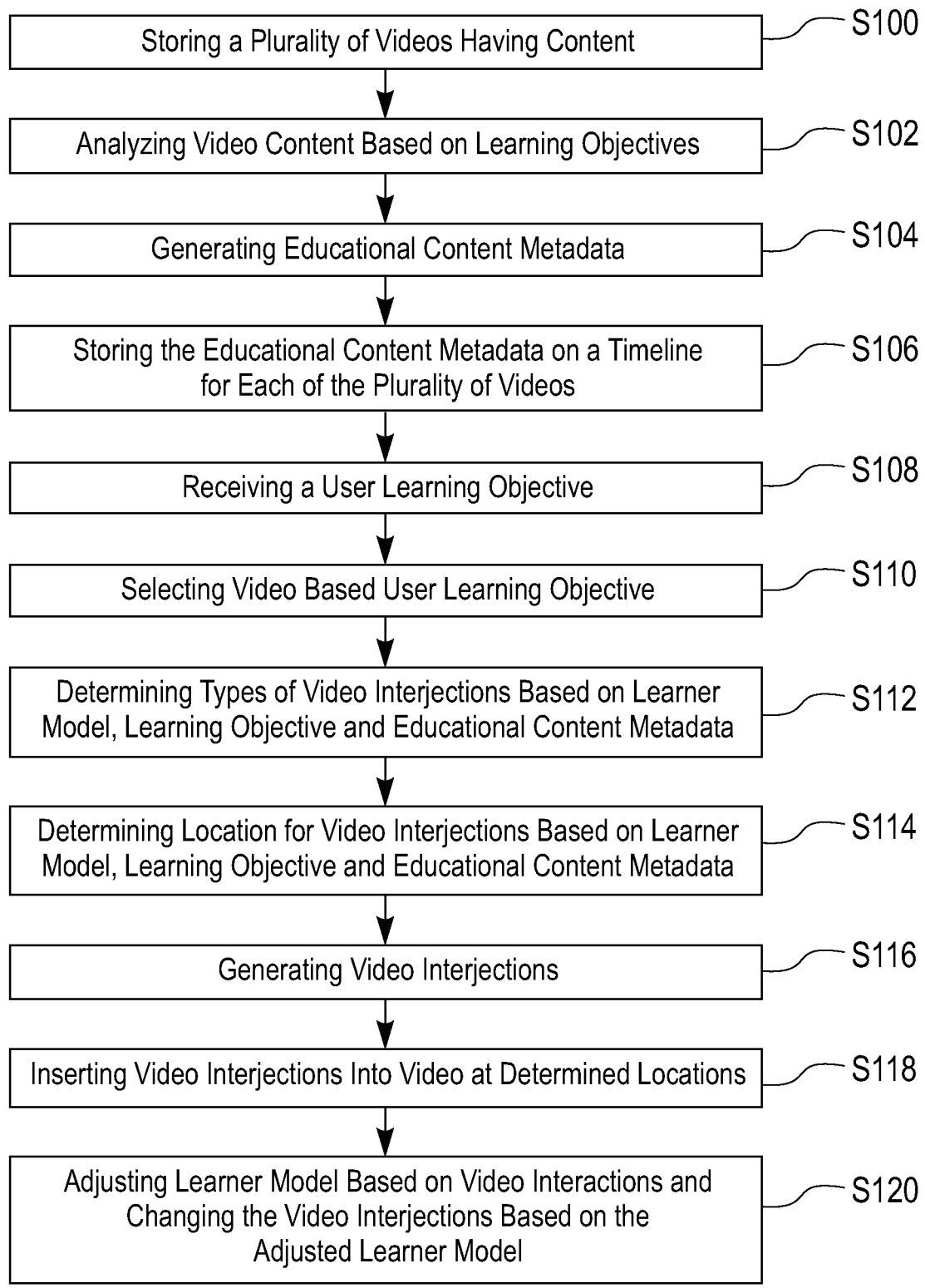
FIG. 3 is a flow diagram of one embodiment of the method disclosed in this specification.

FIG. 3 is a flow diagram of one embodiment of a computer implemented method for adding interjections to a video. The Method includes step S100 of storing a plurality of videos having content, step S102 of analyzing the content of each of the plurality of videos based on a set of learning objectives, step S104 of generating educational content metadata for each of the plurality of videos and step S106 of storing the educational content metadata on a timeline for each of the plurality of videos. The method further includes step S108 of receiving a specific learning objective for a user and step S110 of selecting one of the plurality of videos based on the received user specific learning objective. The method also includes step S112 of automatically determining one or more types of video interjections for the selected video using an analytics engine configured to compare a learner model for the user, the user specific learning objective and the educational content metadata of the selected video and step S114 of automatically determining a location for each of the one or more determined types of video interjections using the analytics engine configured to compare the learner model for the user, the user specific learning objective, and the educational content metadata and timeline of the selected video. The method further includes step S116 of generating a video interjection for each of the one or more determined video interjection types and step S118 of inserting the one or more generated video interjections into the selected video at the respective determined location. IN one embodiment, the method also includes step S120 of dynamically adjusting the learner model based on video interactions of the user in response to a video playback of the selected video with the inserted one or more generated video interjections and dynamically changing the one or more types of video interjections based on the adjusted learner model. For example, based on the learner's competency level of each word, the interjection locations and types are changed dynamically in the video. In one embodiment, the video viewing can be initially uninterrupted, and then the video is played back again to have the learning moments at specific points. In one embodiment, the number of such micro-learning moments is restricted to a threshold to avoid making the video viewing itself unpleasant. E.g. 1 interruption in 5 minutes.

In one exemplary embodiment, the system and method disclosed herein may be used when the learning objective is vocabulary learning. Videos are important for vocabulary tutoring since it can explain a word using variety of examples and activities. Just viewing a video does not ensure that the learner was engaged with the video and has learned the word. The learner model is in one example something that has a list of all the words and the level of mastery for each one per learner. There could be many words unfamiliar to a learner, the learning interjection will focus on one of the words.

In one such example, the each word, the learner's score and number of attempts to respond indicating knowledge of the word are: Arachnid, 0.45, 10; Amphibian, 0.4, 5; Adopt, 0.0001, 0; Pizza, 0.92, 5. Mastery of the word may be used as a range. For example, 0.9 and higher (max of 1.0) means that the word is mastered, while 0.4-0.9 means the learner is working on it, it is in the learner's working set and below 0.4 means the learner is just starting to learn it or struggling with the learn the word.

The a video interjection may include where the learner is required to perform an action such as tapping on the screen immediately when they hear a particular word. The interjection may be where the learner is required to select a set of representative pictures from the screen for which they have heard in utterance in speech. The interjection may be where the learner is asked an assessment question around a word just after the word has been spoken, and the response is recorded and used for deriving and/or updating the learner model to capture the learner's proficiency of the word. In one embodiment, the system may interrupt and relate the current word to a context in a previous recent interaction with the learner that included the word.

In one specific example the learning objective is knowledge and expressiveness of the word Farm. An active listening mode interjection may be tap on the screen each time the word farm is spoken. For example, tap on the screen every time you hear a moo moo sound. A selection activity interjection may be: Which of these pictures show a farm?; Which of these animals can be found on a farm?; Say the word "Farm"; Which of these sounds does a cow make? Who makes the sound oink oink?

In one embodiment, the system and method disclosed herein may be implemented on a cloud computing service. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 4:
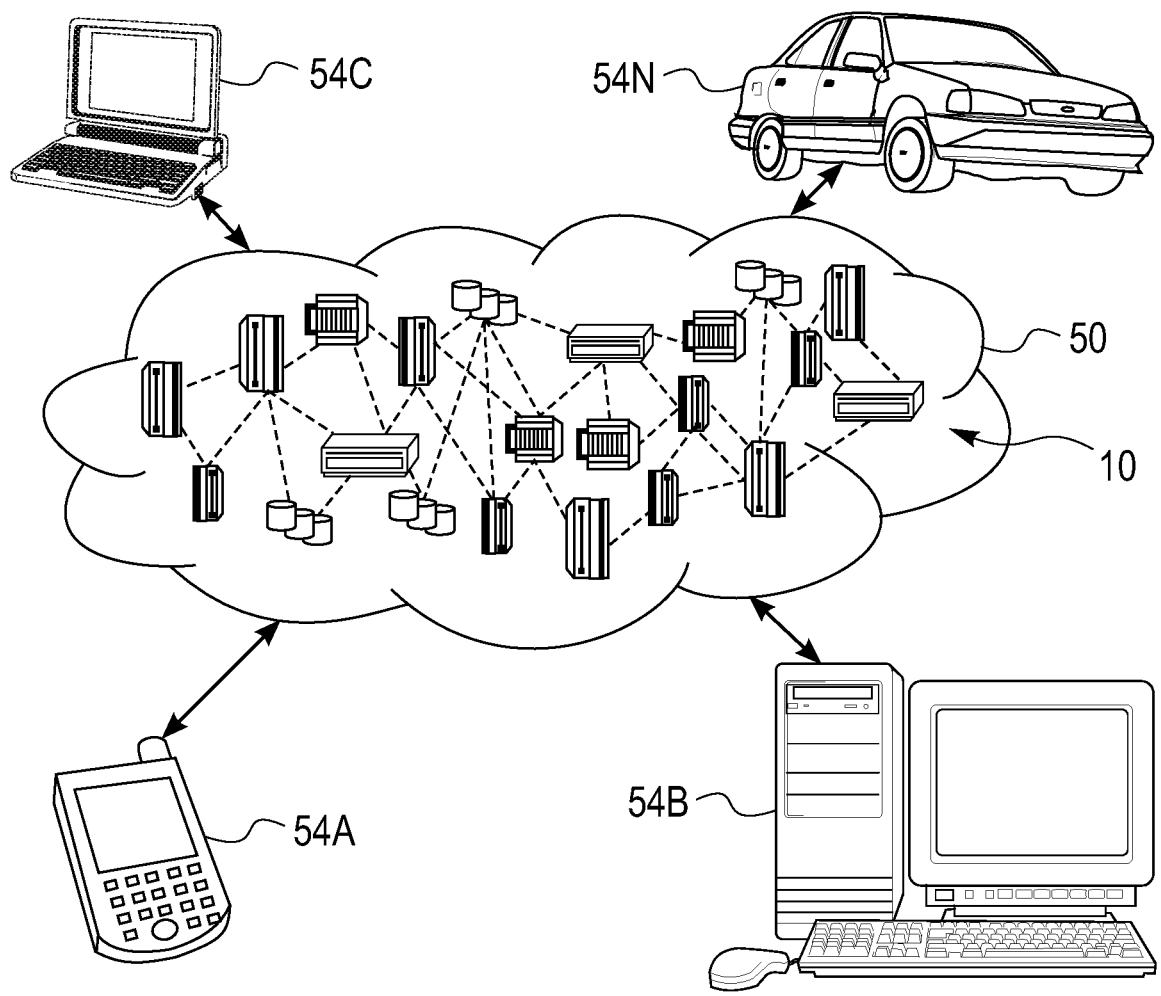
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
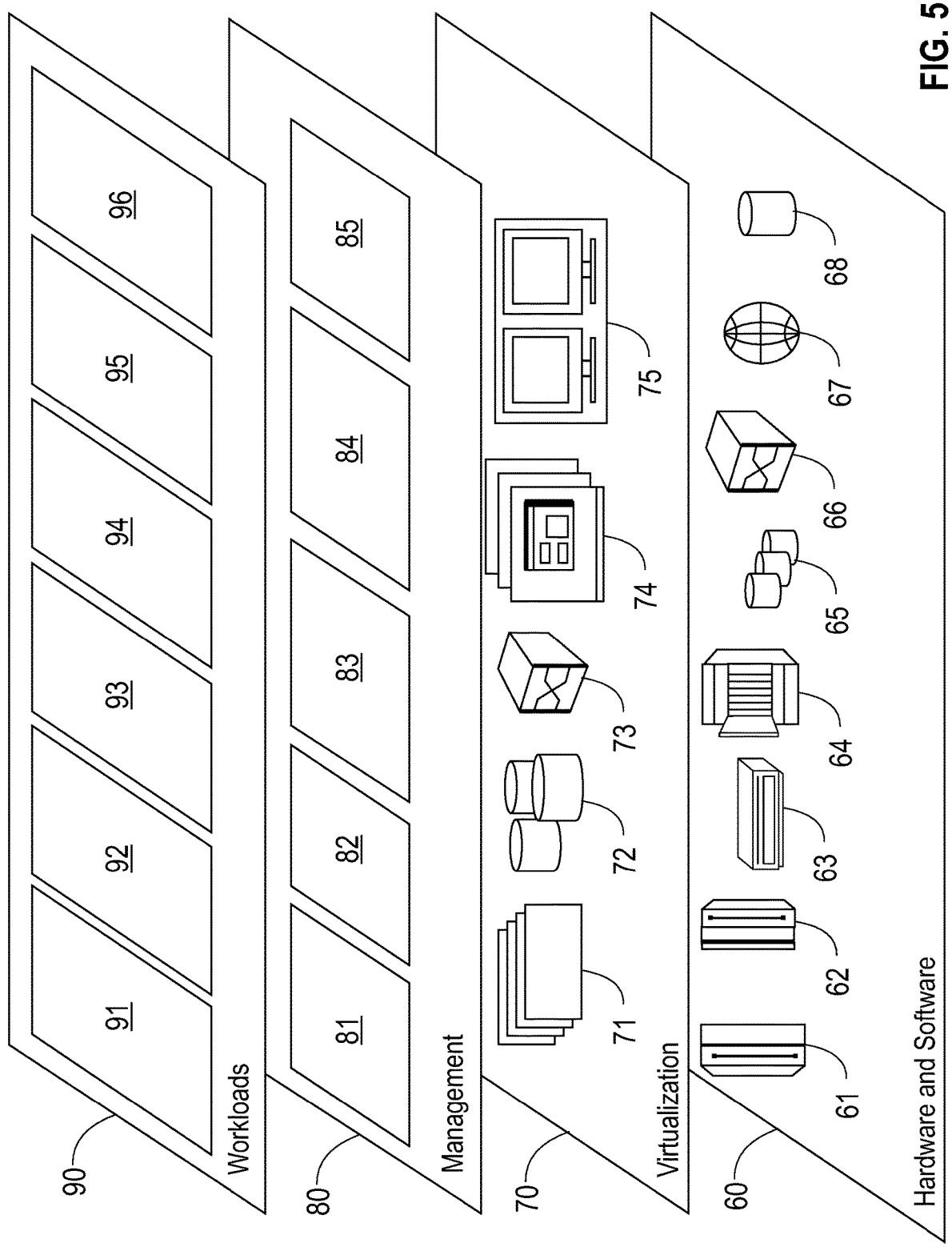
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personalized video interjection generation 96.

Figure 6:
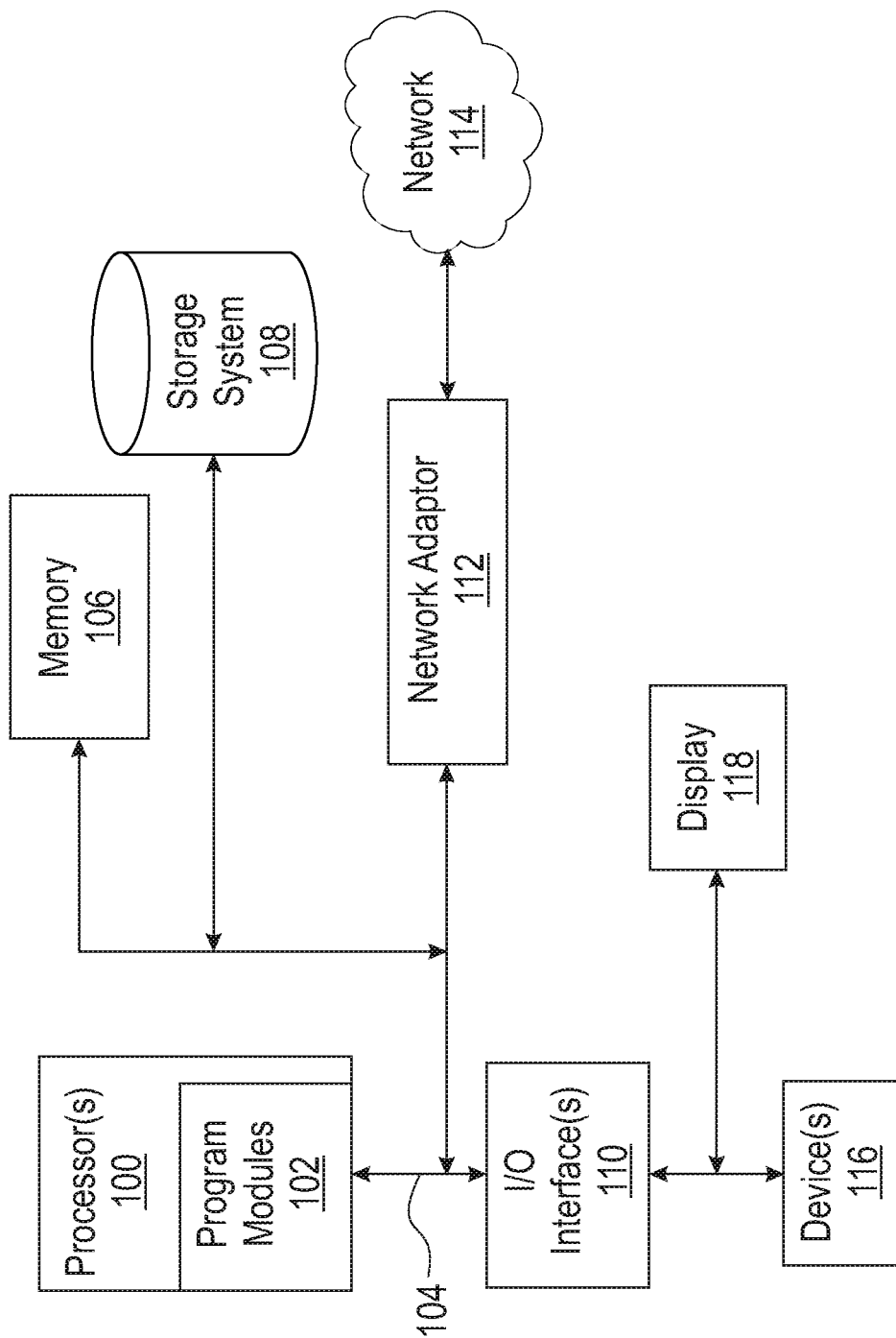
FIG. 6 is a block diagram of an exemplary computing system suitable for implementation of the embodiments of the invention disclosed in this specification.

FIG. 6 illustrates a schematic of an example computer or processing system that may implement the method for generating personalized video interjections based on a learner model and a learning objective in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for adding interjections to a video, comprising:
    storing a plurality of videos having content;
    analyzing the content of each of the plurality of videos based on a set of learning objectives;
    generating educational content metadata for each of the plurality of videos;
    storing the educational content metadata on a timeline for each of the plurality of videos;
    receiving a specific learning objective for a user;
    selecting one of the plurality of videos based on the received user specific learning objective;
    automatically determining one or more types of video interjections for the selected video using an analytics engine configured to compare a learner model for the user, the user specific learning objective and the educational content metadata of the selected video;
    automatically determining a location for each of the one or more determined types of video interjections using the analytics engine configured to compare the learner model for the user, the user specific learning objective, and the educational content metadata and timeline of the selected video;
    generating a video interjection for each of the one or more determined video interjection types; and
    inserting the one or more generated video interjections into the selected video at the respective determined location.

2. The computer implemented method of claim 1, wherein selecting one of the plurality of videos includes selecting a video from a sub-set of videos consisting of one or more of videos previously watched for the user specific learning objective, videos previously favored by the user and videos previously favored by cohorts of the user.

3. The computer implemented method of claim 1, wherein generating a video interjection for each of the one or more determined video interjection types includes matching words of the user specific learning objective with educational content metadata of the selected video.

4. The computer implemented method of claim 3, wherein matching words of the user specific learning objective with educational content metadata of the selected video includes using a web of words.

5. The computer implemented method of claim 3, wherein generating a video interjection for each of the one or more determined video interjection types further includes using the learner model.

6. The computer implemented method of claim 1, wherein automatically determining one or more types of video interjections and automatically determining a location for each of the one or more types of video interjections further includes using a web of words.

7. The computer implemented method of claim 1, wherein automatically generating the video interjections includes generating one of an active listening mode interjection and a contextual assessment mode interjection.

8. The computer implemented method of claim 1, further including dynamically adjusting the learner model based on video interactions of the user in response to a video playback of the selected video with the inserted one or more generated video interjections and dynamically changing the one or more types of video interjections based on the adjusted learner model.

9. A computer system for adding interjections to a video, comprising:
one or more computer processors;
one or more non-transitory computer-readable storage media;
program instructions, stored on the one or more non-transitory computer-readable storage media, which when implemented by the one or more processors, cause the computer system to comprise:
an ingestion and tagging module configured to perform the steps of:
storing a plurality of videos having content;
analyzing the content of each of the plurality of videos based on a set of learning objective;
generating educational content metadata for each of the plurality of videos; and
storing the educational content metadata on a timeline for each of the plurality of videos; and
an analytics engine configured to perform the steps of:
receiving a specific learning objective for a user;
selecting one of the plurality of videos based on the received user specific learning objective;
automatically determining one or more types of video interjections for the selected video using an analytics engine configured to compare a learner model for the user, the user specific learning objective and the educational content metadata of the selected video;
automatically determining a location for each of the one or more determined types of video interjections using the analytics engine configured to compare the learner model for the user, the user specific learning objective, and the educational content metadata and timeline of the selected video;
generating a video interjection for each of the one or more determined video interjection types; and
inserting the one or more generated video interjections into the selected video at the respective determined location.

10. The computer system of claim 9, wherein selecting one of the plurality of videos includes selecting a video from a sub-set of videos consisting of one or more of videos previously watched for the user specific learning objective, videos previously favored by the user and videos previously favored by cohorts of the user.

11. The computer system of claim 9, wherein generating a video interjection for each of the one or more determined video interjection types includes matching words of the user specific learning objective with educational content metadata of the selected video.

12. The computer system of claim 11, wherein matching words of the user specific learning objective with educational content metadata of the selected video includes using a web of words.

13. The computer system of claim 11, wherein generating a video interjection for each of the one or more determined video interjection types further includes using the learner model.

14. The computer system of claim 9, wherein automatically determining one or more types of video interjections and automatically determining a location for each of the one or more types of video interjections further includes using a web of words.

15. The computer system of claim 9, wherein automatically generating the video interjections includes generating one of an active listening mode interjection and a contextual assessment mode interjection.

16. The computer system of claim 9, further including dynamically adjusting the learner model based on video interactions of the user in response to a video playback of the selected video with the inserted one or more generated video interjections and dynamically changing the one or more types of video interjections based on the adjusted learner model.

17. A non-transitory computer program product comprising:
program instructions on a computer-readable storage medium, where execution of the program instructions using a computer causes the computer to perform a method for adding interjections to a video, comprising:
storing a plurality of videos having content;
analyzing the content of each of the plurality of videos based on a set of learning objectives; generating educational content metadata for each of the plurality of videos;
storing the educational content metadata on a timeline for each of the plurality of videos;
receiving a specific learning objective for a user;
selecting one of the plurality of videos based on the received user specific learning objective;
automatically determining one or more types of video interjections for the selected video using an analytics engine configured to compare a learner model for the user, the user specific learning objective and the educational content metadata of the selected video;
automatically determining a location for each of the one or more determined types of video interjections using the analytics engine configured to compare the learner model for the user, the user specific learning objective, and the educational content metadata and timeline of the selected video;
generating a video interjection for each of the one or more determined video interjection types; and
inserting the one or more generated video interjections into the selected video at the respective determined location.

18. The non-transitory computer program product of claim 17, wherein selecting one of the plurality of videos includes selecting a video from a sub-set of videos consisting of one or more of videos previously watched for the user specific learning objective, videos previously favored by the user and videos previously favored by cohorts of the user.

19. The non-transitory computer program product of claim 17, wherein generating a video interjection for each of the one or more determined video interjection types includes matching words of the user specific learning objective with educational content metadata of the selected video using a web of words and the learner model and wherein automatically determining one or more types of video interjections and automatically determining a location for each of the one or more types of video interjections further includes using the web of words.

20. The non-transitory computer program product of claim 17, further including dynamically adjusting the learner model based on video interactions of the user in response to a video playback of the selected video with the inserted one or more generated video interjections and dynamically changing the one or more types of video interjections based on the adjusted learner model.

* * * * *

UNITED STATES PATENT AND TRADEMARK OFFICE
CERTIFICATE OF CORRECTION

| | | |
|---|---|---|
| PATENT NO. | : 10,506,303 B1 | Page 1 of 1 |
| APPLICATION NO. | : 16/040200 | |
| DATED | : December 10, 2019 | |
| INVENTOR(S) | : Ravindranath Kokku | |

It is certified that error appears in the above-identified patent and that said Letters Patent is hereby corrected as shown below:

On the Title Page

Item [73], insert:
--International Business Machines Corporation, Armonk, NY (US)
Sesame Workshop, New York, NY (US)--

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*